(No Model.)
J. W. UNCAPHER & C. F. DEPLANTY.
ATTACHMENT FOR WAGON SEATS.
No. 551,740. Patented Dec. 17, 1895.
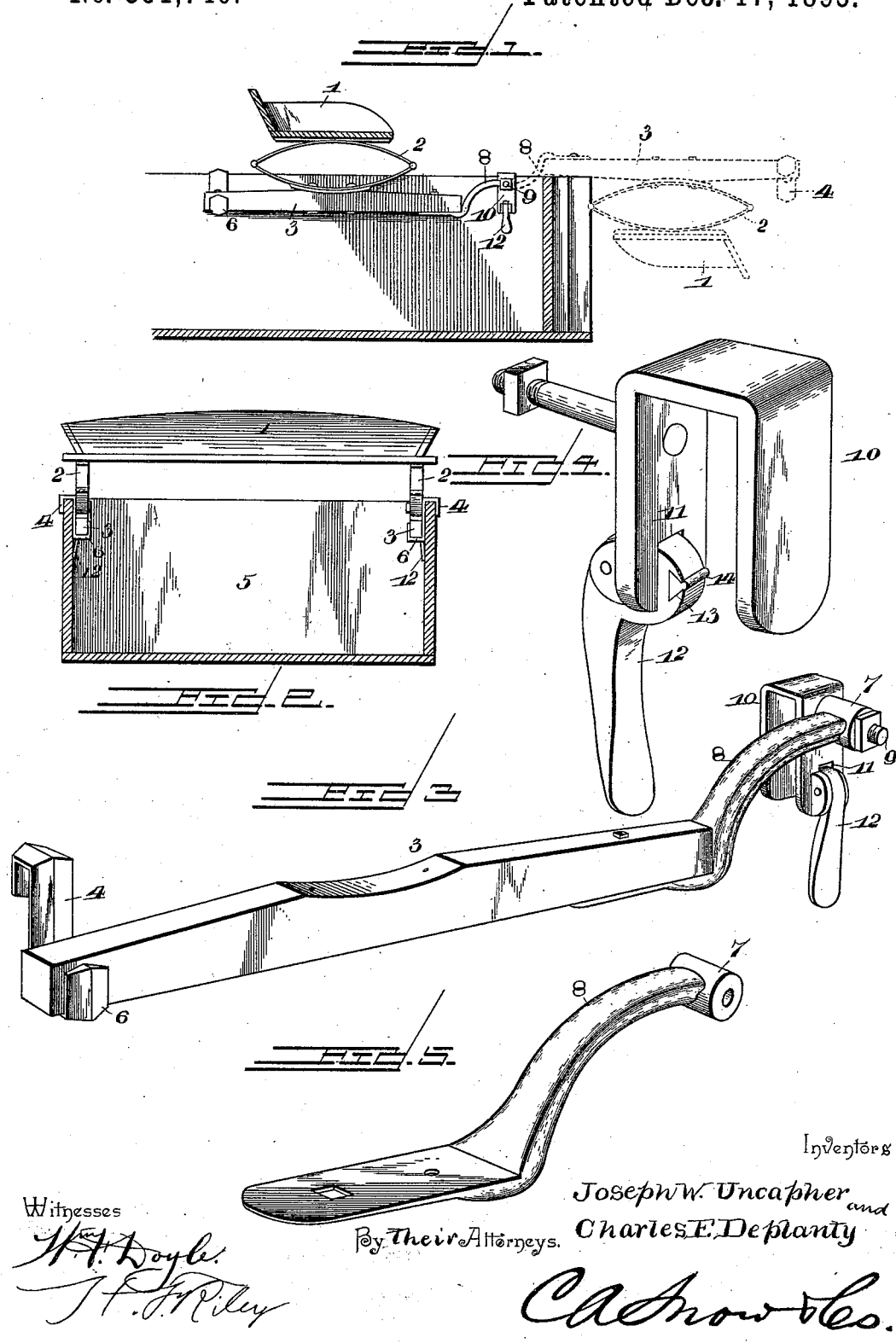
Witnesses
W. H. Doyle.
J. F. Riley
Inventors
Joseph W. Uncapher
and
Charles F. Deplanty
By Their Attorneys.
C. A. Snow & Co.

UNITED STATES PATENT OFFICE.

JOSEPH W. UNCAPHER AND CHARLES F. DEPLANTY, OF COFFEYVILLE, KANSAS; SAID DEPLANTY ASSIGNOR OF ONE-HALF TO SAID UNCAPHER.

ATTACHMENT FOR WAGON-SEATS.

SPECIFICATION forming part of Letters Patent No. 551,740, dated December 17, 1895.

Application filed June 17, 1895. Serial No. 553,124. (No model.)

*To all whom it may concern:*

Be it known that we, JOSEPH W. UNCAPHER and CHARLES F. DEPLANTY, citizens of the United States, residing at Coffeyville, in the county of Montgomery and State of Kansas, have invented a new and useful Attachment for Wagon-Seats, of which the following is a specification.

The invention relates to improvements in attachments for wagon-seats.

The object of the present invention is to provide a simple and inexpensive device which may be readily applied to spring wagon-seats of the ordinary construction, and which will enable a wagon-seat to be adjusted to the desired position on the sides of a wagon-body and firmly secured thereat, and which will permit a wagon-seat to be readily swung forward out of the way when loading or unloading a vehicle.

The invention consists in the construction and novel combination and arrangement of parts hereinafter fully described, illustrated in the accompanying drawings, and pointed out in the claim hereto appended.

In the drawings, Figure 1 is a longitudinal sectional view of a portion of a vehicle having a seat mounted in accordance with this invention. Fig. 2 is a transverse sectional view of the same. Fig. 3 is a detail perspective view of one of the spring-supporting bars provided with the attachment. Fig. 4 is a detail perspective view of the clamp. Fig. 5 is a detail perspective view of the eye and its shank.

Like numerals of reference designate corresponding parts in all the figures of the drawings.

1 designates a wagon-seat provided at its ends with supporting-springs 2, secured to spring-bars 3, each of which is provided at its rear end with a hook 4 for engaging the upper edge of one side of the wagon-body 5. The spring 2 is elliptic and is centrally secured to the bar, which is provided with a centrally-arranged curved recess, forming a seat for the supporting-spring. The hook 4 is inverted and is provided at the lower end of its shank with an L-shaped arm 6, forming a lower hook and receiving and supporting the rear end of the bar 3.

The bar 3 is provided at its front end with an eye 7 having a shank 8, which extends upward and forward from the front end of the bar 3, and which has a flattened rear portion secured to the lower face of the same. The eye 7 is arranged on a horizontally-disposed pivot 9 extending inwardly from the clamp 10, and the latter engages the upper edge of the side of the wagon-body, whereby the bar 3 and the seat 1, which is supported thereon, are adapted to be swung upward and forward on the pivot 9 to arrange the seat out of the way when loading or unloading the vehicle. The eye is retained on the pivot by a nut which screws on the threaded extremity of the latter.

The clamp consists of a substantially rectangular yoke, conforming to the configuration of the upper edge of the wagon-body and provided at one side with a slot or opening 11, and having perforated ears at opposite sides thereof for the reception of a pivot which fulcrums a cam-lever 12 in the slot or opening. The lever 12 is provided with a cam-head, which is adapted to engage frictionally with the side of the wagon-body, whereby the yoke is detachably secured thereto. The head of the cam-lever is provided with a triangular recess or opening 13 in which is arranged a triangular block 14 of rubber or other elastic material, which is forced against the side of the wagon-body when the clamping-lever is in operative position. When the clamping-lever is swung downward its cam-head is carried into engagement with the side of the wagon-body, and it is adapted to be readily swung upward when it is desired to change the position of the seat or remove the same from the wagon-body.

It will be seen that the attachment is exceedingly simple and inexpensive in construction, and that the eye 7 and the clamp may be readily applied to the spring-bars of wagon-seats of the ordinary construction by simply removing the front hooks thereof to provide a place of attachment for the shank of the eye. The rear hooks may be utilized, but with those seats which are not provided with hooks, a rear hook will necessarily form a part of the attachment.

Changes in the form, proportion, and minor details of construction may be resorted to without departing from the principle or sacrificing any of the advantages of this invention.

What we claim is—

The combination with a wagon seat having an elliptical supporting spring, of a bar arranged horizontally and centrally secured to the bottom of the supporting spring and provided with a centrally arranged curved recess forming a seat for the spring, a double rectangular hook having its upper portion arranged to engage the side of a wagon body and having its lower portion extending over the bottom and side faces of the rear end of the bar and conforming to the configuration of the same, a curved arm 8 provided at its front end with an eye and having at its rear end a flat attachment plate located beneath and secured to the front end of the bar, a rectangular clamp open at its bottom and adapted to straddle the upper edge of the side of a wagon body and provided at one side with an opening and having at the other side a horizontal pivot arranged in said eye, a cam lever fulcrumed on the clamp and operating through the opening and provided at its engaging side with a triangular recess, and an elastic triangular block seated in the triangular recess and projecting beyond the lever and adapted to engage the side of a wagon body, substantially as described.

In testimony that we claim the foregoing as our own we have hereto affixed our signatures in the presence of two witnesses.

JOSEPH W. UNCAPHER.
CHARLES F. DEPLANTY.

Witnesses:
GEORGE W. JENKINS,
WILLIAM HYDE.